(12) United States Patent
Cooper

(10) Patent No.: US 7,731,480 B2
(45) Date of Patent: Jun. 8, 2010

(54) EFFICIENT POWER TURBINE AND ELECTRICAL GENERATION SYSTEM

(76) Inventor: Benjamin J Cooper, 18211 Hawthorne Ave., Bloomington, CA (US) 92316

(*) Notice: Subject to any disclaimer, the term of this patent is extended or adjusted under 35 U.S.C. 154(b) by 618 days.

(21) Appl. No.: 11/697,724

(22) Filed: Apr. 7, 2007

(65) Prior Publication Data

US 2007/0297895 A1 Dec. 27, 2007

Related U.S. Application Data

(60) Provisional application No. 60/790,099, filed on Apr. 7, 2006, now abandoned.

(51) Int. Cl.
*F01D 1/00* (2006.01)
(52) U.S. Cl. .................... 415/202; 415/169.2; 415/143; 415/116
(58) Field of Classification Search .............. 415/169.2, 415/169.4, 202, 199.5, 199.4, 221, 143, 116
See application file for complete search history.

(56) References Cited

U.S. PATENT DOCUMENTS

| | | | | | |
|---|---|---|---|---|---|
| 3,293,851 | A | * | 12/1966 | Hulbert et al. | 60/669 |
| 4,224,797 | A | * | 9/1980 | Kelly | 60/652 |
| 4,258,551 | A | * | 3/1981 | Ritzi | 60/654 |
| 4,363,216 | A | * | 12/1982 | Bronicki | 60/657 |

* cited by examiner

*Primary Examiner*—Ninh H Nguyen

(57) ABSTRACT

A power turbine is provided in the form of a set of plates that cooperate to form a housing, with a set of spaced apart disks mounted on a shaft within the housing. Some of the plates and disks cooperate to allow gas or steam to be injected to provide a driving force on the shaft, while others of the disks and plates cooperate to form one or more integral pumps. The pumps are used to pull cooling liquid or water into the housing, and to cool the driving disks. In this way, the steam that drives the disks is condensed while still in the housing, with a water level maintained on the driving disks. In operation, the steam directly acts on the disks toward the outer circumference of the disks, but more toward the center of the disk, the steam transfers its energy to the water, and the water transfers the energy to the disk. Since water is less compressible and able to efficiently transfer energy to the disks, the power turbine is able to operate at relatively slow speeds, has good low-speed torque, and still has excellent conversion efficiency.

21 Claims, 11 Drawing Sheets

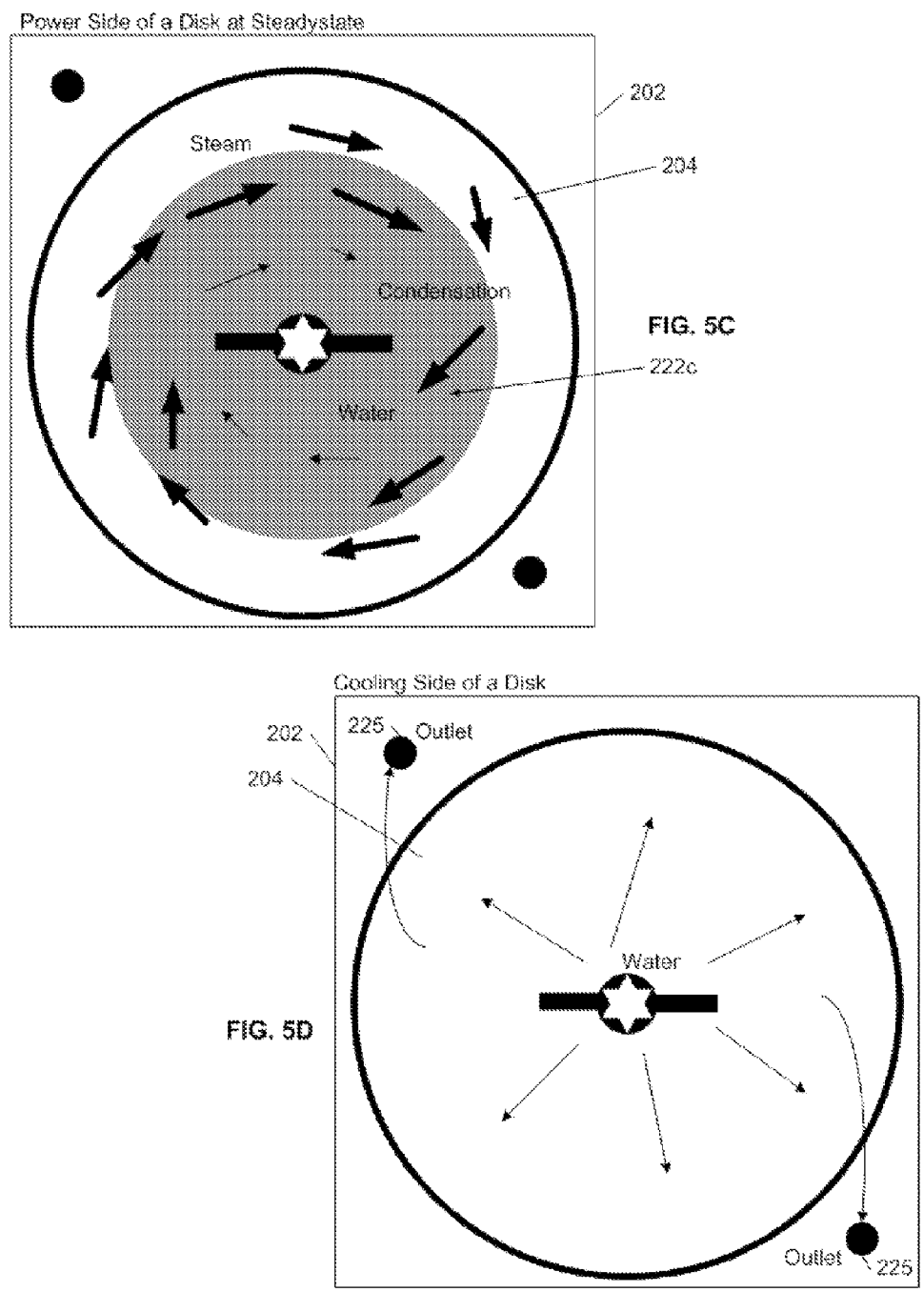

End Plate With Water Feed

Pump Plate and Spacer

Injector Plate with Disk

End Plate Without Water Feed

Shaft

Shaft Cap

Steam Injector

EFFICIENT POWER TURBINE AND ELECTRICAL GENERATION SYSTEM

This application is claims priority to U.S. patent application Ser. No. 60/790,099, filed Apr. 7, 2006, and entitled "Liquid/Gas Disk Power-Generation Turbine System", which is incorporated herein in its entirety.

BACKGROUND

The field of the present invention is the construction and use of power turbines, which in one example, may be used to drive an electrical generator.

Power turbines are essential to modern life. They are used to drive electrical generators, power vehicles, and drive industrial equipment. Generally, a power turbine uses an energy source to generate a mechanical kinetic power that may be used in another process. Often, the power turbine is driven by steam from a boiler, or may be driven by water, for example, at a hydroelectric facility. In converting the energy source into usable power, the power turbine also consumes some of the energy, and may allow some of the energy to be wasted in the conversion process. Accordingly, all power turbines have an energy conversion efficiency rating, which is a measure of how effectively the power turbine converts energy to usable power.

To more effectively utilize energy sources, and to reduce the size of the power turbines, it is desirable to use turbines with higher conversion ratings. Accordingly, the power turbine industry is continually advancing turbine technology to develop more efficient and better performing power turbines. One such advancement was the Tesla turbine. The Tesla turbine was developed in the early 1900's, and was touted as having very high efficiency ratings, possibly even well over 90%. The Tesla design is well known, but generally uses a set of closely aligned disks in a housing. Steam is injected at the circumference of the disks, which spirals to the center, where the steam is ejected. The spiraling seam uses a molecular adhesion process to transfer energy to the disks, which drive a central shaft. In order to achieve good efficiencies, the spiraling path has to made as long as possible, which requires that the Tesla turbine spin very fast, for example, at 30,000 to 40,000 rpm. This also meant that if the turbine slowed when under load, the turbine would quickly and dramatically lose power, leading to catastrophic failure of the drive process. Further, the fast rotational speed also meant that complex and sophisticated transmission systems had to be employed to bring the speed down to a more usable rate.

With these practical limitation to the Tesla turbine, it has failed to achieve widespread adoption. Instead, the Tesla technology is primary used as a pump. As a pump, liquid is pulled into the center of the disks, and the rotating disks use a centrifugal force to drive the liquid to the outer circumference, where the liquid is extracted. The Tesla pump is widely used, and is recognized as being capable of reliably pumping many types of liquids.

Accordingly, there exists a need for a power turbine with better efficiency.

SUMMARY

Briefly, the present invention provides a power turbine in the form of a set of plates that cooperate to form a housing, with a set of spaced apart disks mounted on a shaft within the housing. Some of the plates and disks cooperate to allow gas or steam to be injected to provide a driving force on the shaft, while others of the disks and plates cooperate to form one or more integral pumps. The pumps are used to pull cooling liquid or water into the housing, and to cool the driving disks. In this way, the steam that drives the disks is condensed while still in the housing, with a water level maintained on the driving disks. In operation, the steam directly acts on the disks toward the outer circumference of the disks, but more toward the center of the disk, the steam transfers its energy to the water, and the water transfers the energy to the disk. Since water is less compressible and able to efficiently transfer energy to the disks, the power turbine is able to operate at relatively slow speeds, has good low-speed torque, and still has excellent conversion efficiency.

Since the power turbine is constructed as a set of coupled plates and disks, the power turbine may be easily sized and configured for a wide range of applications. For example, the power turbine may have an electrical generator coupled to its shaft for generating electricity. In this way, a single device is able to use steam to generate a driving force, pump cooling water, and generate electricity.

BRIEF DESCRIPTION OF THE DRAWINGS

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views. It will also be understood that certain components and details may not appear in the figures to assist in more clearly describing the invention.

FIGS. 5A, 5B, 5C, and 5D illustrate steam and water flow on a disk for a power turbine system in accordance with the present invention;

DETAILED DESCRIPTION

Figure 1:
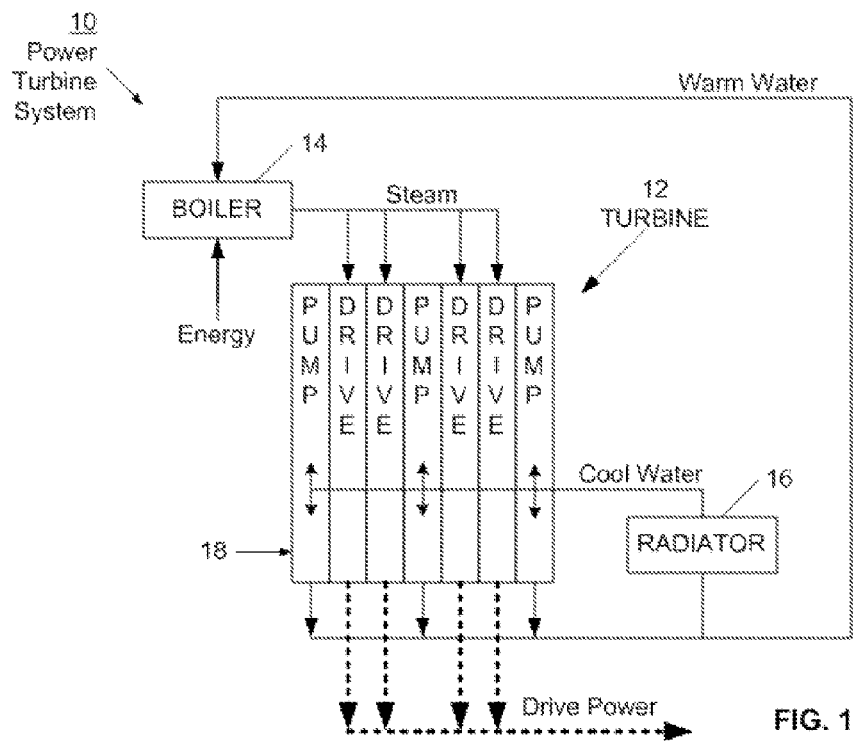
FIG. 1 is a simplified block diagram of a power turbine system in accordance with the present invention.

Referring now to FIG. 1, a power turbine system 10 is illustrated. Power system 10 has turbine 12 driven by steam from a boiler 14. Boiler 14 may receive its energy, for example, from a solar concentrator or other energy source. Turbine 12 is constructed as an arrangement of pump sections and drive sections connected to form a housing. In this way, turbine 12 has drive sections constructed to convert the steam power into mechanical energy, with the mechanical energy providing both the drive power output for the turbine 12, as well as the power to drive the integral pumps. In one construction, turbine 12 is constructed as a set of connected plates 18. These plates may be connected in several ways, for example, by bolting them together. It will be appreciated that various alignment keys or members may be used. In this way, pumps of different sizes may be readily constructed. For example, a more powerful turbine may be constructed by adding more drive and pump plates. Power turbine system 10 injects steam in to each of the drive sections. As the steam transfers its energy in the drive sections, the steam cools and eventually condenses. The condensed water is extracted from turbine 12 by the pump sections. More particularly, the force of the steam in the drive sections assists in driving the condensed water into the pump section, and the pump section uses a centrifugal force to transport the water outside the turbine housing. In a preferred operation, the drive sections cooperate with spinning disks to provide a driving force. More particularly, steam interacts with the disks to provide an adhesive effect, similar to the well known Tesla turbine effect. In this way, the steam directly transfers energy to the disks, and assists in driving the disks in a forward rotation. However, in contrast to the Tesla turbine, water is also maintained in the drive section. The water, which typically is concentrically positioned around a central shaft, is also pushed by the steam, and thereby provides additional driving force to the disks. It will be appreciated that the steam provides a force acting to push the water toward the center of the disk, while the centrifugal force of the disc acts to move the water towards the circumference edge of the disk. Accordingly, the amount of water in the drive section will depend on several factors, including the force of the steam, the size of the disk, and the rotational speed of the disk.

Advantageously, the drive section uses both steam and water to provide a driving force to disks. When the turbine 12 is starting up, the drive sections may be relatively filled with water. In this way, the steam transfers its energy efficiently to the large surface area of the water, and the water is able to efficiently transfer the rotational energy to the disks. Also, as the turbine is initially relatively cool, the steam will more readily condense to water, further providing additional fluid to act on the driving disks. As the disk rotational speed of the turbine is increased, and the temperature of the turbine rises, a relatively steady state of water may be maintained in the drive section. The particular amount of water maintained in the drive section may be adjusted according to be pressure of the steam, the speed of rotation, and the temperature of the turbine, for example. Turbine 12 has a hot fluid output port for extracting the hot water, which includes water condensed from the steam. This hot water may be cooled in a radiator 16, and then moved into the pump sections. It will be appreciated that an outside source of cool water may also be provided, which can further cool the pump sections. As illustrated, the pump sections are positioned next to the drive sections, and are used to both remove condensed water, as well as you move a cooling fluid through turbine 12. In this way, the condensation process inside the driver sections may be controlled or adapted.

Figure 2:
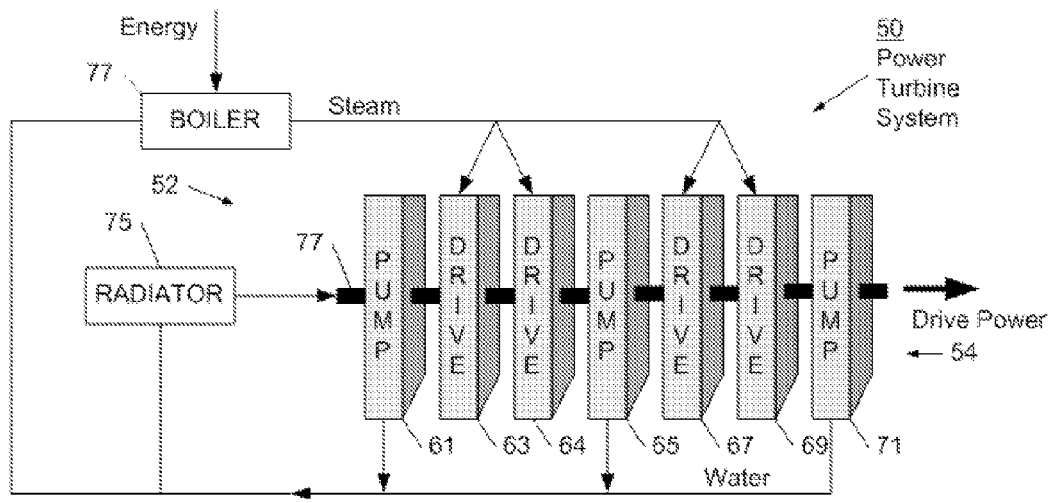
FIG. 2 is a simplified block diagram of a power turbine system in accordance with the present invention.

Referring now to FIG. 2, another power turbine system 50 is illustrated. Power turbine system 50 has energy received into a boiler 77. Boiler 77 provides steam, which is injected into drive sections 63, 64, 67, and 69. Each of these drive sections has one or more associated disk(s) that is driven to provide the turbine's drive power. The drive power is provided both directly by the steam transferring energy to the disk, and by the steam acting upon water in each drive section, with the water then transferring energy to the disk. Since in some conditions the water has a more efficient energy transfer mechanism, the water is able to more efficiently transfer the steam's energy to the drive disk. Depending on specific requirements, the level of water may be adjusted in each drive section to rely more or less on direct steam forces, or more or less on forces acting through the water.

A shaft 77 connects the drive sections, as well as connects to pump sections 61, 65, and 71. Each of the pump sections is in fluid communication with its adjacent drive section, enabling condensed fluid from the drive sections to received into the pump. The centrifugal force in each pump is able to transport condensed water out a hot fluid line to radiator 75, where the water is cooled. The cooled water may be then be received into the pumps for facilitating cooling the drive sections. In one example, the water is received through inlets integrally formed in the shaft, so that water is received at the center of each disk, and then under centrifugal force, moved to the circumference of the disk, where the water is expelled out the hot outlet port. In this way, the drive disks are cooled to facilitate and adjust condensation effects. In operation, each of the drive sections is simultaneously driven both directly by steam and by water. More particularly, each drive section uses an adhesive steam process similar to that used in a Tesla turbine, as well as using the steam to drive water, which in turn drives the disks. By having each drive section simultaneously use two different drive processes, a particularly efficient power turbine system may be constructed. For example, power turbine system 50 may operate in the range of five to 6000 rpm, which is considerably less than a typical Tesla turbine. Operating at a slower speed, coupling mechanisms, vibration, and mechanical and control processes are simplified. Further, since the presence of water in the drive section facilitates a better transfer of energy, particularly at slower speeds, the power turbine 50 has greatly improved low-speed torque. Accordingly, power turbine system 50 resists the catastrophic failure of a typical Tesla turbine when recommended loads are exceeded. In this way, power turbine system 50 is able to better react and adapt to changing load requirements, and enables simplified mechanical or electronic control.

Figure 3:
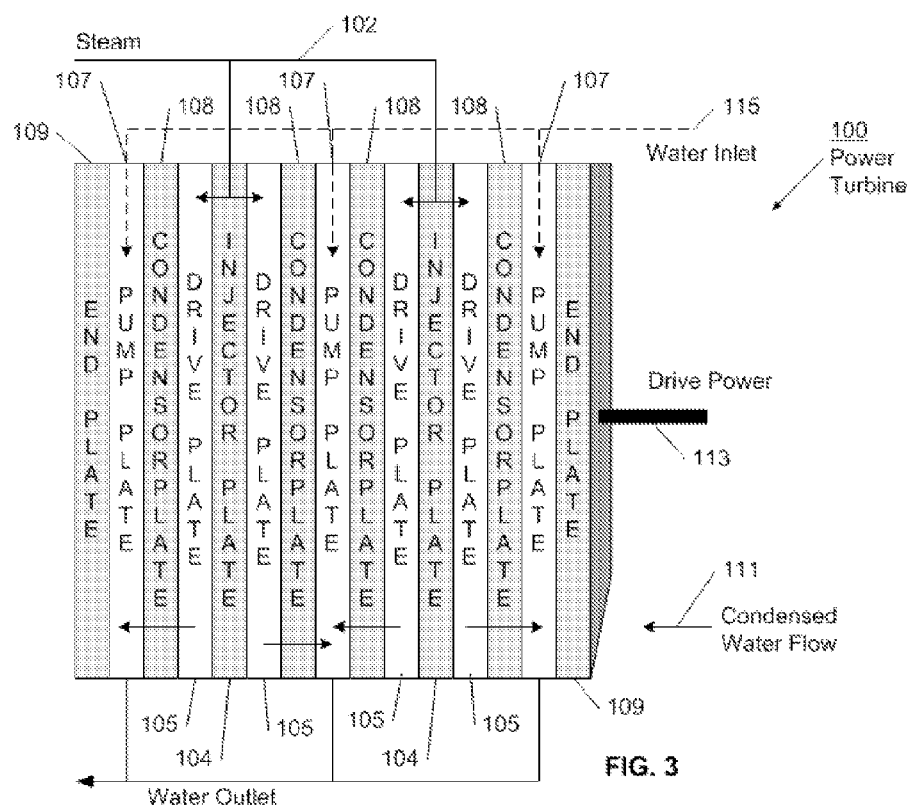
FIG. 3 is a simplified block diagram of a power turbine in accordance with the present invention.

Referring now to FIG. 3, power turbine 100 is illustrated. Power turbine 100 is constructed as a set of connected plates forming a turbine housing. Turbine 100 has an end plate 109 adjacent to a pump plate 107. The pump plate has water inlet 115, which may be for example, positioned in or near the shaft 113. In this way, cooling water may be received near the center of the pump, and then the cooling water moved to the circumference by centrifugal force. Pump plate 107 provides an open space for providing the pump effect. Adjacent to pump plate 107 a condenser plate 108 is positioned. Condenser plate 108 surrounds a condenser disk, which has one side adjacent to the pump plate space, and the other side adjacent to the drive plate 105. In this way, condenser plate 108 performs several functions. First the pump side of the condenser plate acts to move cooling water from the center of the turbine towards the circumference. The condenser plate also is cooled by the cooling liquid, and so assists in condensing steam in the drive plate. Also, one side of the condenser plate is adjacent to drive plate, so is simultaneously acted upon by both steam and water to assist in driving the shaft to provide drive power.

A drive plate 105 is provided next to the condenser plate. The drive plate provides a space for steam and water to interact with adjacent disks. The steam 102 is injected into the driver plate space 105 using injector plate 104. The injector plate 104 surrounds a drive disk. In this way, the drive disk is driven by steam and water from the driver plate space. As illustrated an injector plate and disc has a drive plate on each side. The turbine housing may be constructed by arranging and assembling these simple plates, disks, and spaces according to application requirements. In this way, a wide variety of turbines may be constructed using the same or similar component parts.

Generally, power turbine 100 is constructed using alternating functional sections. A power section is constructed with an injection plate having two adjacent drive plates. The power section is constructed to receive steam, for example at 200 to 600 pounds per inch, and drive disks with a combination of both steam and water power. A pumping section includes a pump plate with two adjacent condenser plates. The pumping section is used to move cooling water through the turbine, as well as extract the water from the condensed steam. Multiple power sections and pumping sections may be coupled according to specific turbine requirements. At each end of the turbine, an end plate is substituted for one of the condenser plates. In this way, the end plates act to seal the turbine, and one or both plates may provide for water inlet or outlet. Also, since the turbine ends with a modified pumping section, the end sections are relatively cool. It will be appreciated that other arrangements may be use.

Figure 4:
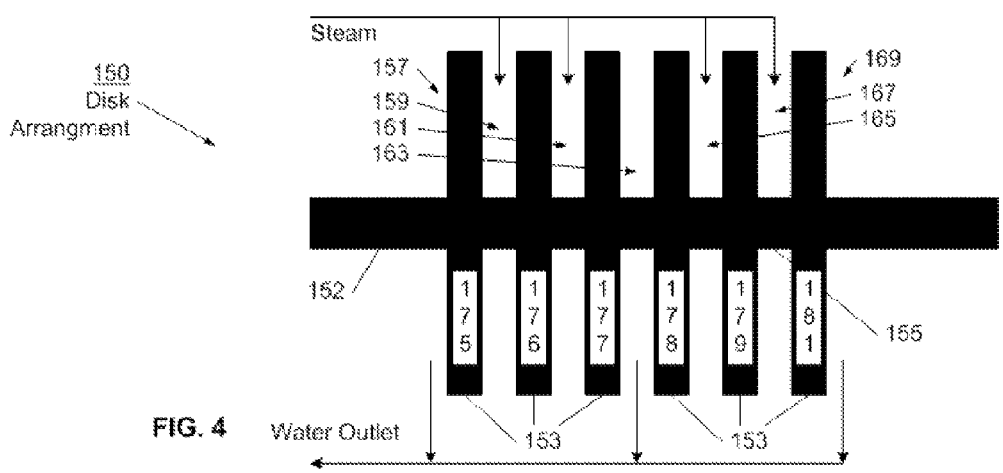
FIG. 4 is a simplified block diagram of a disk and space arrangement for a power turbine system in accordance with the present invention.

Referring now to FIG. 4, a disk arrangement 150 is illustrated. Disk arrangement 150 is arranged in a manner similar to power turbine 100. Accordingly, disk arrangement 150 shows a central shaft 152 having discs 153 and spacers 155 between the disks. Preferably, the disks 153 are the same, and all the spaces 155 are all the same to facilitate ease of assembly. However, it will be appreciated that other more differentiated constructions may be used. In this illustration, the end plates are not shown. Accordingly, the pump plate (107) surrounds a pump space 157 while a condenser plate (108) surrounds the condenser disc 175. A drive plate (105) surrounds a drive space 159, and an injector plate (104) surrounds drive disc 176. Another drive plate (105) surrounds drive space 161, and a condenser plate (108) surrounds condenser disk 177. Pump plate (107) surrounds a pump space 163 while a condenser plate (108) surrounds condenser disc 178. A drive plate (105) surrounds a drive space 165, and an injector plate (104) surrounds drive disc 179. Another drive plate (105) surrounds drive space 167, and a condenser plate (108) surrounds condenser disk 181. A pump plate (107) surrounds a pump space 169, and an end plate (not shown) is at the end. In operation, steam is injected into the drive spaces 159, 161, 165, and 167. The steam uses an adhesion process to drive disks, and as the steam spirals to the interior, the steam pushes against a volume of water contained in the drive space. The level of the water is adjusted according to the steam pressure, the temperature of the turbine, and the rotational speed, for example. The steam transfers kinetic and heat energy to the water, causing the water to additionally drive the disks. Since the steam loses energy, and also cools, it condenses, and the resulting fluid is added to the volume of water.

Some of the water passes through water ports into the pump spaces, where centrifugal force moves the water to outlet ports near the circumference of the disks. The hot water is passed outside the turbine housing, where it may be cooled or mixed with cooler water, so the water may be returned to the turbine. The returned water acts both to cool the condenser disks to facilitate condensing of the steam, as well as assure that the drive spaces have sufficient water.

Figure 5A:
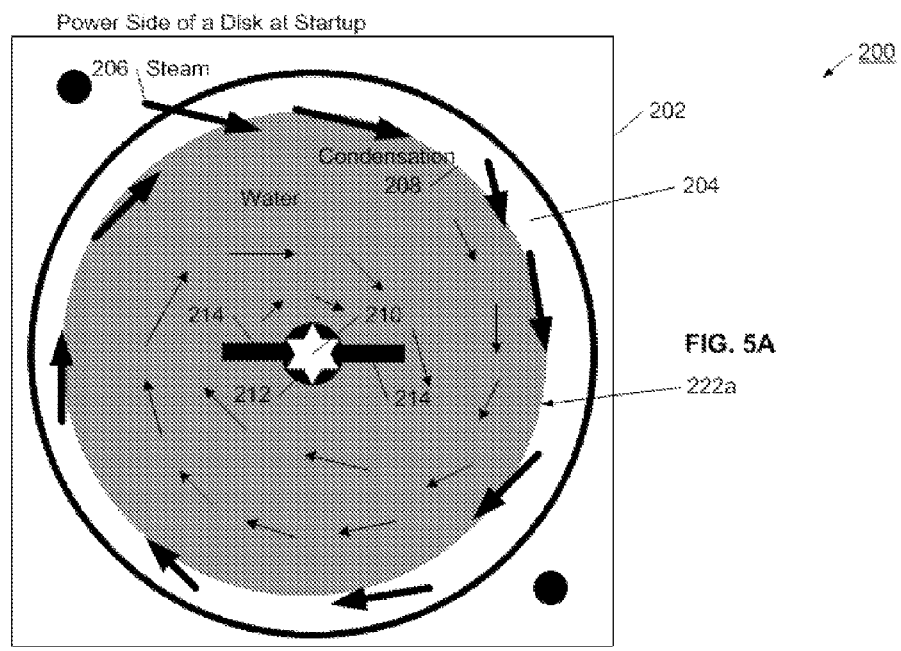

Referring now to FIG. 5, a condensation system 200 is illustrated. The illustrated system 200 has a single condensation plate 202 and a single disk 204. FIG. 5A shows the drive side of the condensation system at startup of the turbine. Accordingly, the disk 204 is at first stopped, and then slowly begins rotating as the steam 206 enters the turbine. The drive space has been pre-filled with water 222a, so the steam immediately pushes against the water, which efficiently transfers the forward energy to the disk 204. The disk 204 is coupled to the shaft 210, which allows the drive energy to be transferred outside the turbine. The shaft 210 has flutes or grooves 212 that allow water to be moved into the turbine, and to move between spaces within the turbine. The disks also have water ports 214 that allow the grooves to be in communication with the drive and pump spaces. In this way, cool water may be received into drive and pump spaces from outside the turbine, and condensed water from the drive spaces may be moved to the pump spaces. Water in the pump spaces may then be propelled to an outlet line, and the water moved outside the turbine housing.

Since the pump is also just beginning to spin up, little water is pulled from the drive space. Also, the steam readily condenses 208, as its energy is quickly transferred to the liquid, and the entire turbine assembly is relatively cool. Advantageously, at startup, the primary means of moving the disk is through the reaction of the steam-energized water with the disk. Since this is a relatively efficient transfer, the turbine has good startup torque, and efficiently spins to its steady-state speed.

Figure 5B:
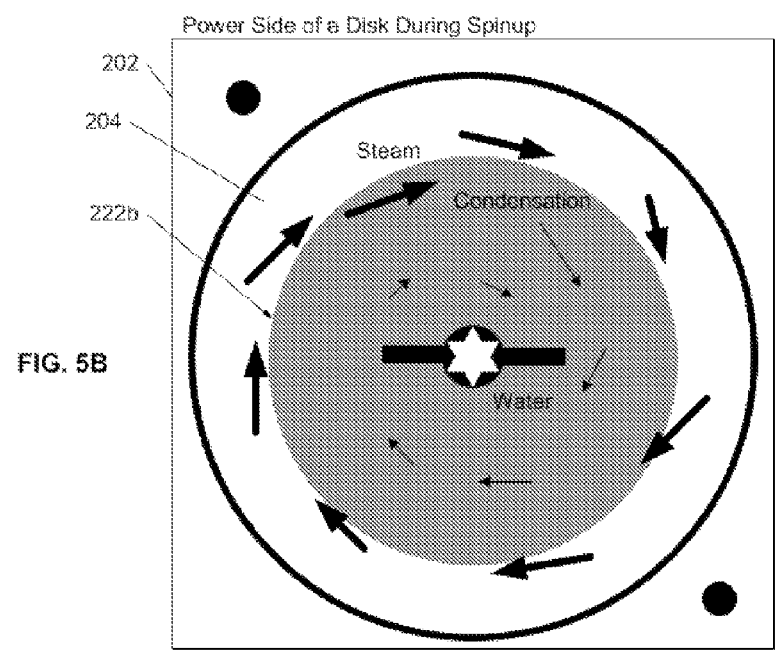

As the disk picks up speed, and the pump begins operating, the steam will act to push the water level 222b more toward the center of the disk, as shown in FIG. 5B. However, since the turbine is still heating up, the steam still condenses rather quickly, and the water level 222b remains a significant driver for the disc. When the disk reaches steady state, as shown in FIG. 5C, the water level 222c may be set at a relatively consistent area. In setting the water level, several competing forces are involved. For example, a faster rotational speed will cause the water to spin further toward the circumference due to centrifugal forces, but, the same faster rotational speed will cause the pumps to move more water out of the drive spaces, tending to draw the water level toward the center. As higher pressure steam, or more steam, is applied, the steam will tend to push the water level toward the center, but the increased amount of steam will produce more condensation liquid, which will tend to make the water level rise. It will be appreciated that other forces also affect the water level, such as amount of external water added, and the temperature of the external water. With all these variable, it can be understood that the turbine may be readily adapted for various applications. For example, the turbine can be adjusted for required speed, load, temperature, and environmental characteristics. In this way, the disclosed turbine is highly flexible, and may be adapted by particular construction arrangements, or may be dynamically adjusted through measurement and control processes, which may be electronic, pneumatic, or mechanical.

FIG. 5D shows the pump side of the disk, which uses centrifugal forces to move water from the center of the disk to the outer circumferences, where the water is pushed out the outlet holes 225. Although the disk system has been described using water and steam, it will be understood that other gas/fluid substance may be used according to the environmental requirements. In this way, the turbine may be adapted for higher or lower temperature operation.

FIGS. 6 through 15 show one example construction of a power turbine using coupled plates. It will be understood that the drawings may not be to scale to facilitate ease of explanation. It will also be understood that detail may have been removed from the drawings to simplify the explanation and emphasize the novel features of this construction. Finally it will be understood that many alternatives may be conceived consistent with this disclosure. In the figures, all the plates are shown as having the same thickness. However, it will be appreciated that plates may be of different thicknesses. For example, the end plates may be substantially thicker than the interior plates to provide structural integrity. Other plates may be adjusted according to specific design and spacing requirements.

Figure 6:
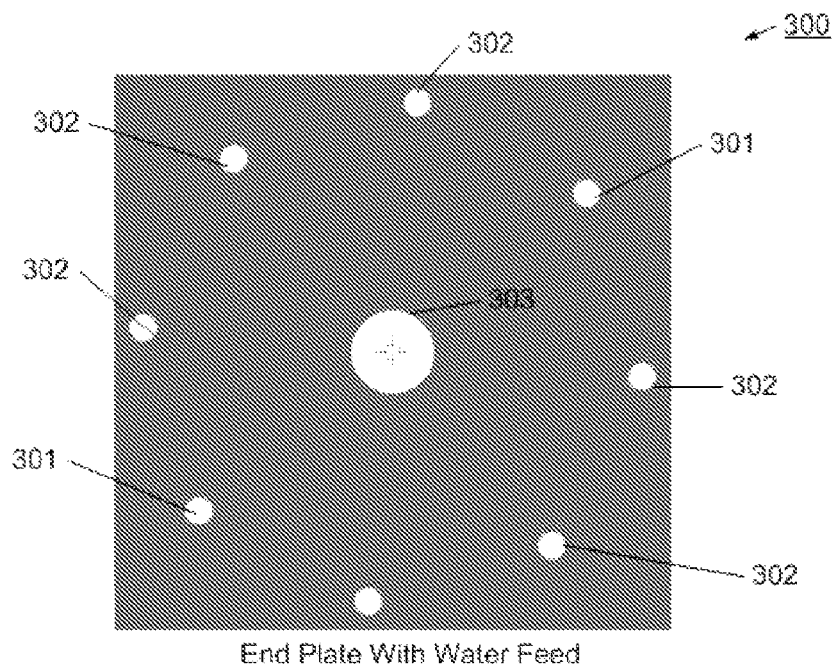
FIG. 6 is an illustration of an end plate for a power turbine system in accordance with the present invention.

FIG. 6 shows an end plate 300. End plate 300 has a central opening 303 for receiving a drive shaft that will be fully described below. In one example the drive shaft also has grooves for receiving a water inlet. The plate has several bolt holes 302 for allowing plates to be securely bolted together. It will be appreciated that other constructions may allow welding or other types of fastening. end plate 300 also has water outlet holes 301. These outlet holes 301 communicate with other outlet holes in other plates to provide a hot fluid exit line for the turbine. In an example construction, the end plate 300 is generally in the shape of a square with about 10 inch sides, and is about 0.25 to 0.5 inches thick. The opening 303 may be about 1.02" in diameter. The bolt holes 302 and water port holes 301 may be 0.5 inches in diameter. The plate may be made of a metal or a composite material, for example. It will be understood that other sizes and materials may be used according to specific design requirements.

Figure 7:
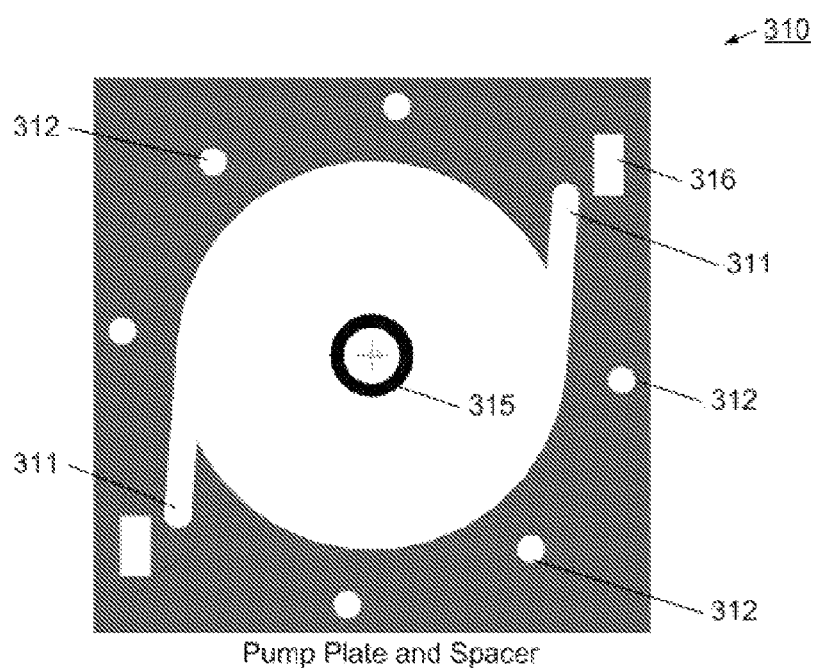
FIG. 7 is an illustration of a pump plate for a power turbine system in accordance with the present invention.

FIG. 7 shows a pump plate and spacer 310. The pump plate is positioned around a shaft, with a spacer 315 providing an open pump space. The pump plate 310 has bolt holes 312, as well as fluid ports 311. Fluid ports 311 enable fluid communication from the hot fluid output line to the pump space. In this way, fluid centrifugally moved from the center to the circumference will be expelled through the fluid port 311 into the fluid output line to fluid output port 301. Pump plate 310 also has an alignment block 316, which is used for a aligning a steam injector (described later). In the example construction, the pump plate 310 is generally in the shape of a square with about 10 inch sides, and is about 0.050 inches thick. The spacer 315 is also about 0.050 inches thick, and may be about 1.50 inches in outside diameter, and have a central opening of about 1.00 inches for receiving a shaft. The plate and spacer may be made of a metal or a composite material, for example. It will be understood that other sizes and materials may be used according to specific design requirements.

Figure 8:
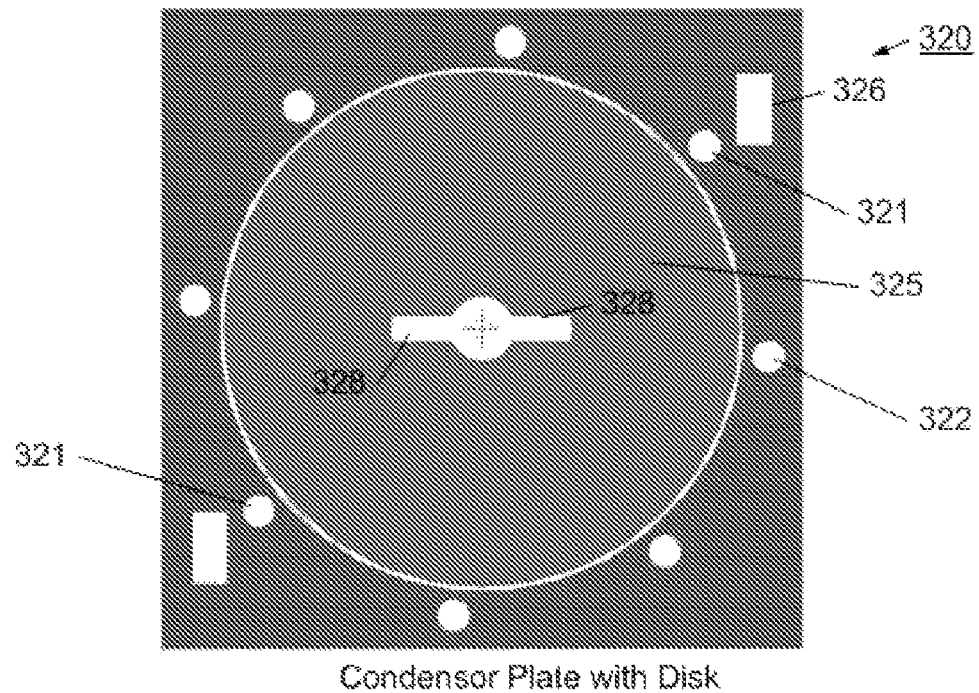
FIG. 8 is an illustration of an condenser plate for a power turbine system in accordance with the present invention.

FIG. 8 shows a condenser plate and disc 320. The condenser plate has bolt holes 322, as well as water holes 321 that cooperate with the other water holes for forming the hot fluid exit line. The disk 325 has water ports 328 which allow fluidic communication to the grooves in the shaft. In this way, water flowing in the grooves of the shaft may be moved in to or out of pump and drive spaces. For example, water from a drive space may be moved into a pump space, or external cooling liquid may be moved into a pump space from outside the turbine. The condenser plate also has an alignment block 326 for aligning a steam injector (described later). In the example construction, the condenser plate 320 is generally in the shape of a square with about 10 inch sides, and is about 0.050 inches thick. The condenser plate has a circular opening of about 8.2 inches for receiving disk 325. The disk 325 is also about 0.050 inches thick, and may be about 8.00 inches in outside diameter, and have a central opening of about 1.00 inches for receiving a shaft. The last 0.25 inches of the outer circumference of the disk 325 is thinned to about 0.046 to 0.048 inches to better receive the injected steam. The water ports extend about 1.5" from the center of the disk 325. The alignment block is about 0.25 inches by 0.5 inches. The plate and disk may be made of a metal or a composite material, for example. It will be understood that other sizes and materials may be used according to specific design requirements.

Figure 9:
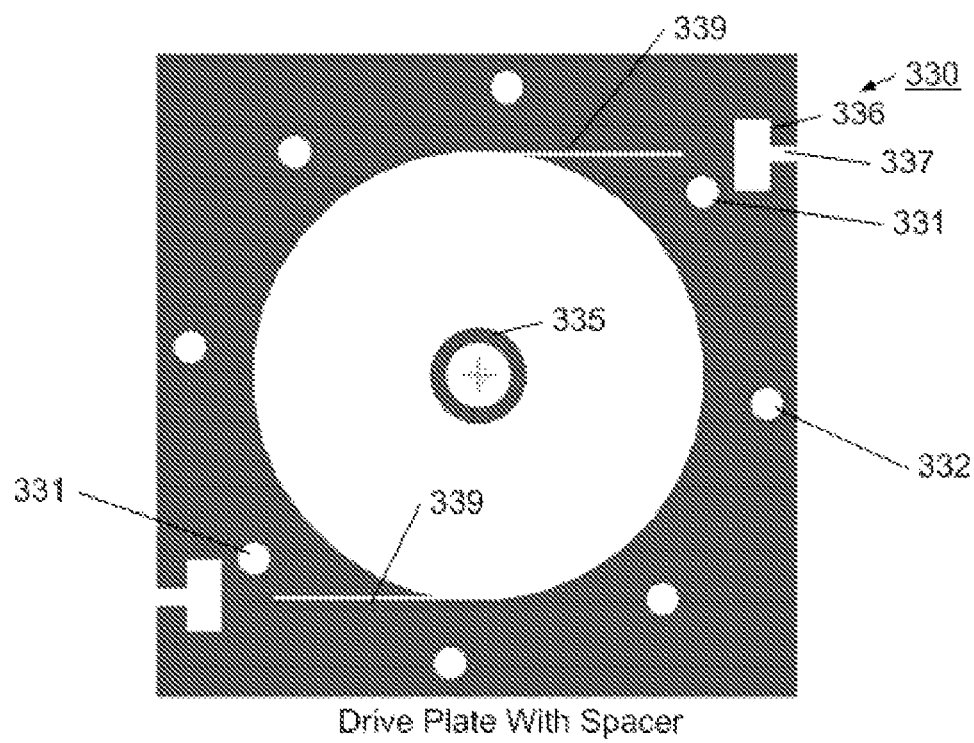
FIG. 9 is an illustration of a drive plate for a power turbine system in accordance with the present invention.

FIG. 9 shows a drive plate with spacer 330. The Drive plate has an open center section surrounding a spacer 335 for creating a drive space. An alignment block 336 holds a steam injector (described later), and has a steam coupler cut-out 337. The drive plate also has water holes 331 and bolt holes 332 as described earlier. The drive plate has steam injectors 339, which receive steam from an adjacent injector plate and allow high pressure steam to be passed into the drive space. The steam then interacts through adhesion process with disks, causing the disks to spin. Since the drive space also has a quantity of water, energy from the steam is also transferred to the water, and that energy is transferred efficiently to the disk. In the example construction, the drive plate 330 is generally in the shape of a square with about 10 inch sides, and is about 0.050 inches thick. The opening 337 may be about 0.13 inches, and the steam injectors 339 may be about 0.05 inches wide. The spacer 335 is also about 0.050 inches thick, and may be about 1.50 inches in outside diameter, and have a central opening of about 1.00 inches for receiving a shaft. The plate and spacer may be made of a metal or a composite material, for example. It will be understood that other sizes and materials may be used according to specific design requirements.

Figure 10:
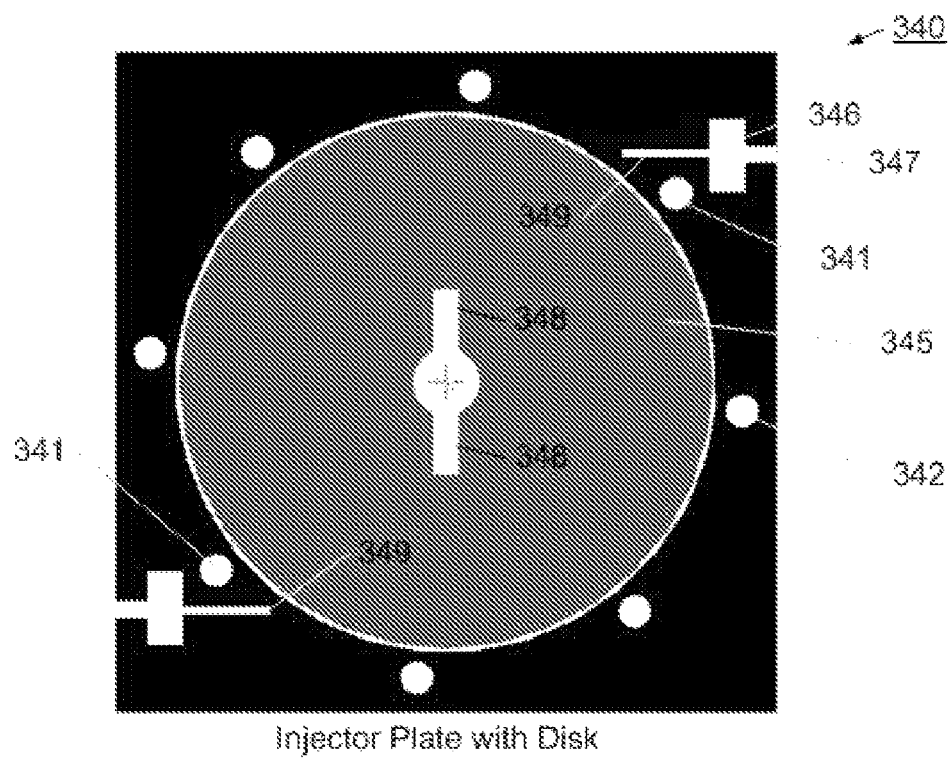
FIG. 10 is an illustration of an injector plate for a power turbine system in accordance with the present invention.

FIG. 10 shows an injector plate and drive disk 340. The injector plate also has an alignment block 346 for holding a steam injector (described later), as well as a coupler cut-out. A steam injector 349 cooperates with the steam injector 339 described with reference to FIG. 9 for injecting steam into a drive space. The injector plate also has water holes 341 and bolt holes 342 as described earlier. As with the condenser plate, the drive plate 345 also has water ports 348 for providing fluidic communication with the fluted or grooved shaft. In the example construction, the injector plate 340 is generally in the shape of a square with about 10 inch sides, and is about 0.050 inches thick. The injector plate has a circular opening of about 8.2 inches for receiving disk 345. The disk 345 is also about 0.050 inches thick, and may be about 8.00 inches in outside diameter, and have a central opening of about 1.00 inches for receiving a shaft. The water ports 348 extend about 1.5" from the center of the disk 345. The alignment block 346 is about 0.25 inches by 0.5 inches. The steam injector 349 is about 0.10 inches wide. The plate and disk may be made of a metal or a composite material, for example. It will be understood that other sizes and materials may be used according to specific design requirements.

Figure 11:
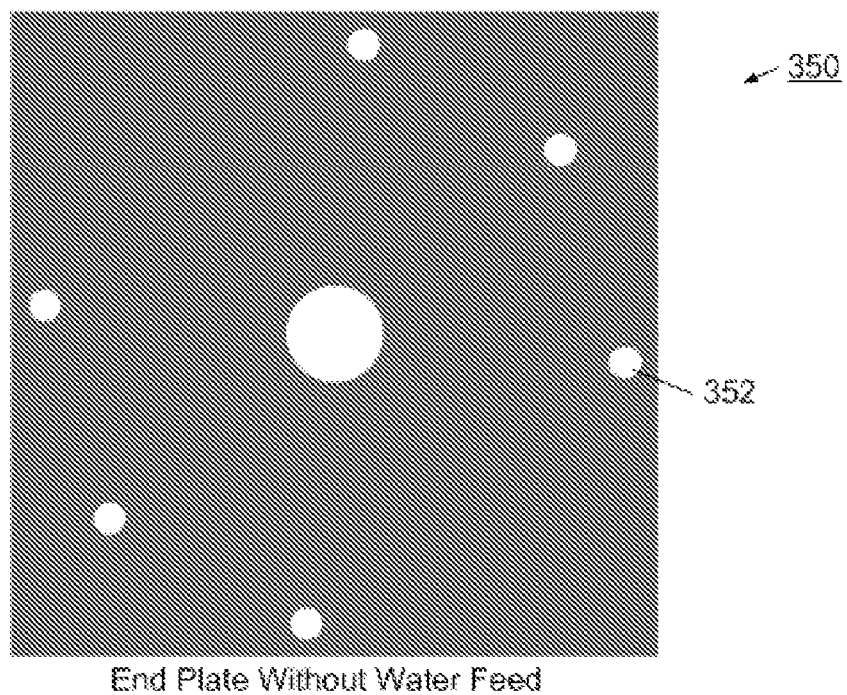
FIG. 11 is an illustration of an end plate (without water outlets) for a power turbine system in accordance with the present invention.

FIG. 11 shows an end plate 350. End plate 350 also has bolt holes 352, but has no water holes. In this way, water is only ejected through end plate 300 described with reference to FIG. 6. It will be understood that other fluid paths and exit lines may be defined. In the example construction, the end plate 350 is generally in the shape of a square with about 10 inch sides, and is about 0.25 to 0.5 inches thick. The central opening may be about 1.02" in diameter. The bolt holes 302 may be 0.5 inches in diameter. The plate may be made of a metal or a composite material, for example. It will be understood that other sizes and materials may be used according to specific design requirements. Advantageously, the housing structure for a power turbine may be constructed using various combination of the plates described with reference to FIGS. 6 through 11. Accordingly, turbines may be constructed for a wide range of load, speed, or environmental characteristics.

Figure 12:
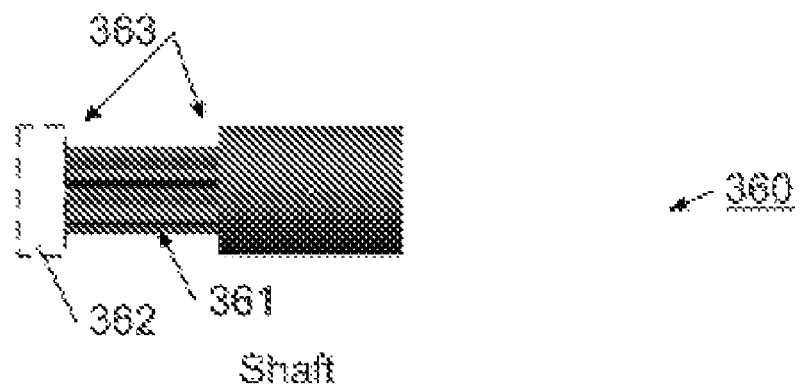
FIG. 12 is an illustration of a shaft for a power turbine system in accordance with the present invention.
Figure 13:
FIG. 13 is an illustration of a shaft cap for a power turbine system in accordance with the present invention.

FIG. 12 shows shaft 360 for use in the turbine. The shaft has a fluted or grooved area 361 for allowing water to be passed from the outside to the turbine, and between spaces within the turbine. The flutes or grooves in shaft area 361 cooperate with water ports on the disks to allow for movement of water. The plates are received into plate receiving area 363, with an end cap 362 securely fastening the shaft to the disks and spacers. The cap 370, as illustrated in FIG. 13, is constructed to cooperate with the end of the shaft 360. The cap 370 may threadably attach, frictionally attach, or otherwise be coupled to shaft 360. The fluted portion 363 may be about 3.0 inches long, with the total shaft 360 being about 6.0 inches long. The end cap 370 may also be about 3.0 inches long, with a central recess for receiving the shaft. The shaft may be made of a metal or a composite material, for example. It will be understood that other sizes and materials may be used according to specific design requirements.

Figure 14:
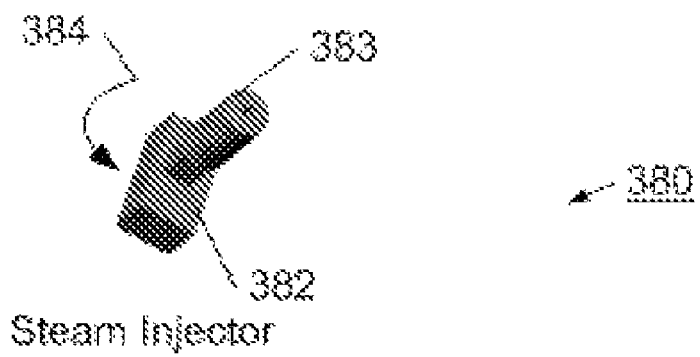
FIG. 14 is an illustration of a steam injector for a power turbine system in accordance with the present invention.

FIG. 14 shows the steam injector 380. Steam injector 380 has a rectangular alignment block 382 which cooperates with the alignment blocks in some of the plates to assist in properly aligning the steam injector. The steam injector couples to a high-pressure steam line through coupler 383. The block 382 has an injector hole 384 (not visible) which ejects high pressure steam into steam injector 349 illustrated in FIG. 10. The steam from steam injector 349 is then communicated to steam injector 339, which directs the steam into the drive space and against the drive disks. The alignment block may be about 0.50 by 0.25 by 0.25 inches, while the coupler is about 0.25 inches in diameter. The steam injector 384 may be about 0.15 inches in diameter. The injector may be made of a metal or a composite material, for example. It will be understood that other sizes and materials may be used according to specific design requirements.

Figure 15:
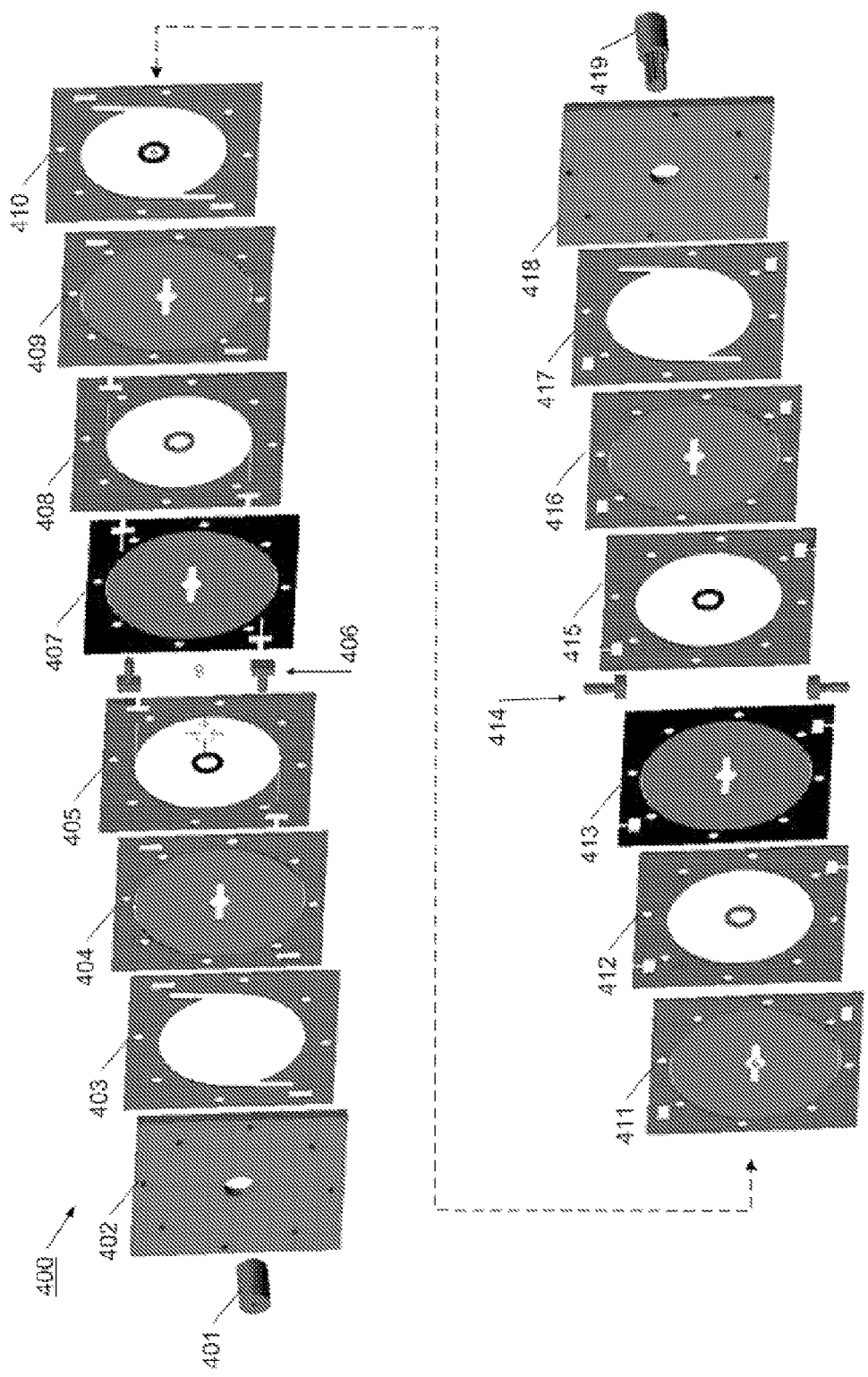
FIG. 15 is an exploded view of a power turbine in accordance.

FIG. 15 shows an exploded view of one possible construction of a power turbine. Power turbine 400 has a shaft 419 which extends through the turbine and is tightly coupled to an end cap 401. The end cap 401 has a water inlet hole for receiving water, which is moved through grooves on shaft 419 to inside the turbine. The grooves on shaft 419 also facilitate movement of water between spaces within the turbine. The shaft is held in the center of the turbine by central openings in the end plates 402 and 418. These central openings may have seals or bearings as is well understood. The entire assembly of plates is held together through cooperating bolt holes in the plates. It will be understood that other fastening mechanisms may be used.

Turbine 400 is constructed having an end plate 402 similar to end plate 300. The end plate 300 has water outlet ports for allowing water to be expelled from the turbine. In this way, cooler water may be received through shaft 401, and pumped through pump spaces and expelled through the water outlet ports. Cooperating holes between the plates act to form a hot fluid exit line. Turbine 400 also has a pump plates 403, 410, and 417, which are similar to plump plate 310. It will be appreciated that pump plates 403 and 417 do not have spacers, as the shaft and end cap provide the required spacing. Accordingly, only plump plate 410 is illustrated with its associated spacer. Turbine 400 also has condenser plate and disk 404, 409, 411, and 416, which are similar to condenser plate and disk 320. Turbine 400 also has drive plates and spacers 405, 408, 412, and 415, which are similar to drive plate and spacer 330. Turbine 400 also has injector plate and disks 407 and 413, which are similar to injector plate and disk 340. Injectors 406 and 414 are positioned in the alignment rectangles for securely and accurately positioning the steam injection jet. It will be understood that the injectors may be positioned according to the desired direction of rotation, and that injectors may be positioned such that one or more injectors cause a forward direction and another one or set of injectors causes a reverse direction. In this way, by activating one set of injectors a forward motion may be enabled, and by enabling a different set of injectors at another time, a reverse direction may be enabled.

Figure 16:
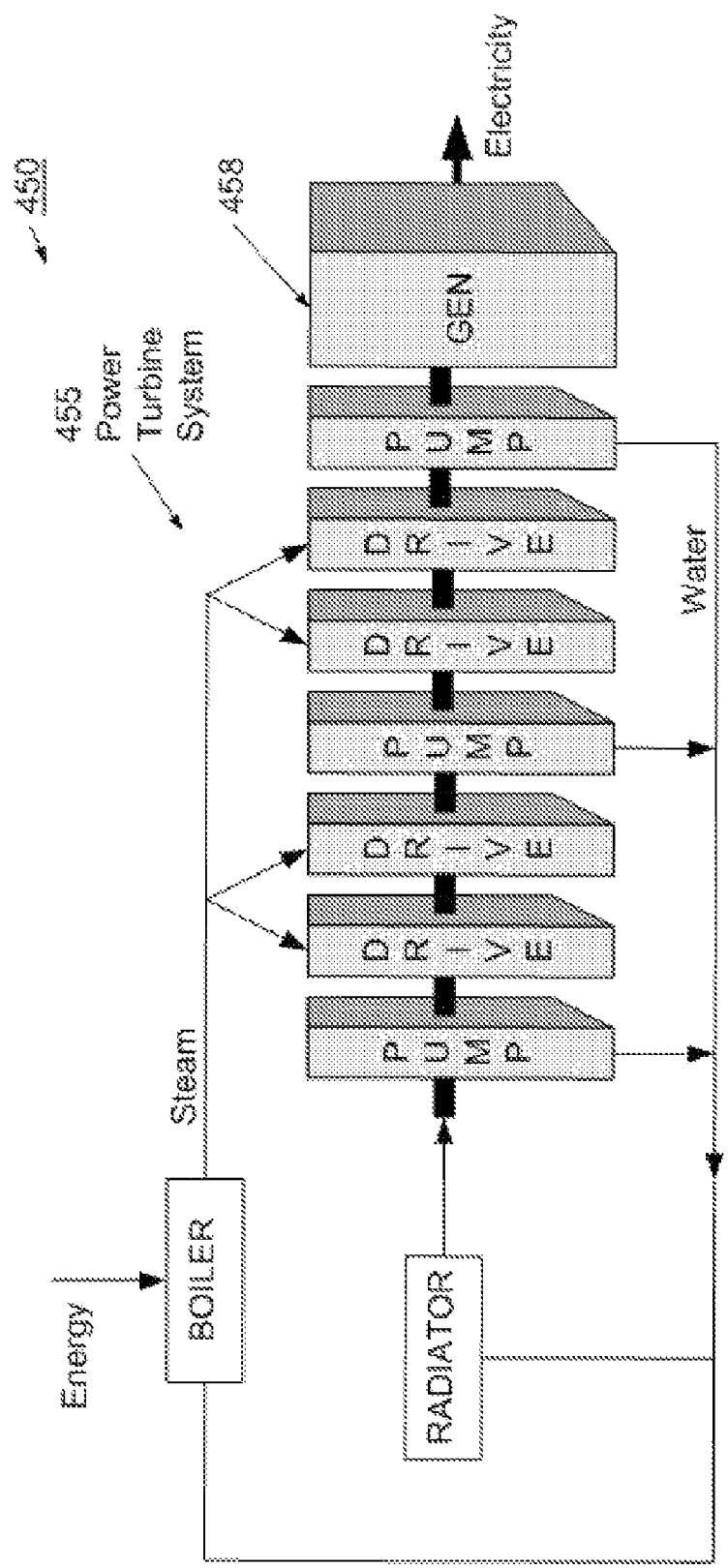
FIG. 16 is a simplified block diagram of a power turbine system for generating electricity in accordance with the present invention.

Referring now to FIG. 16, an electrical generation system 450 is illustrated. Electrical generation system 450 has a power turbine system 455 similar to power turbine system 50 described with reference to FIG. 2. Accordingly, power turbine system 455 will not be described in detail. The power turbine system 455 has a central shaft which is received into an electrical generator 458. Electrical generator produces electricity for use outside the turbine. The generator 458 preferably is directly connected to the turbine shaft, although other connections may be made. Also, the generator 458 is preferably sized for directly bolting to the power turbine system four and 55, using the bolt holes provided in the turbine plates. In this way, a single housing provides for a driving force, a pumping function, as well as electrical generation.

Figure 17:
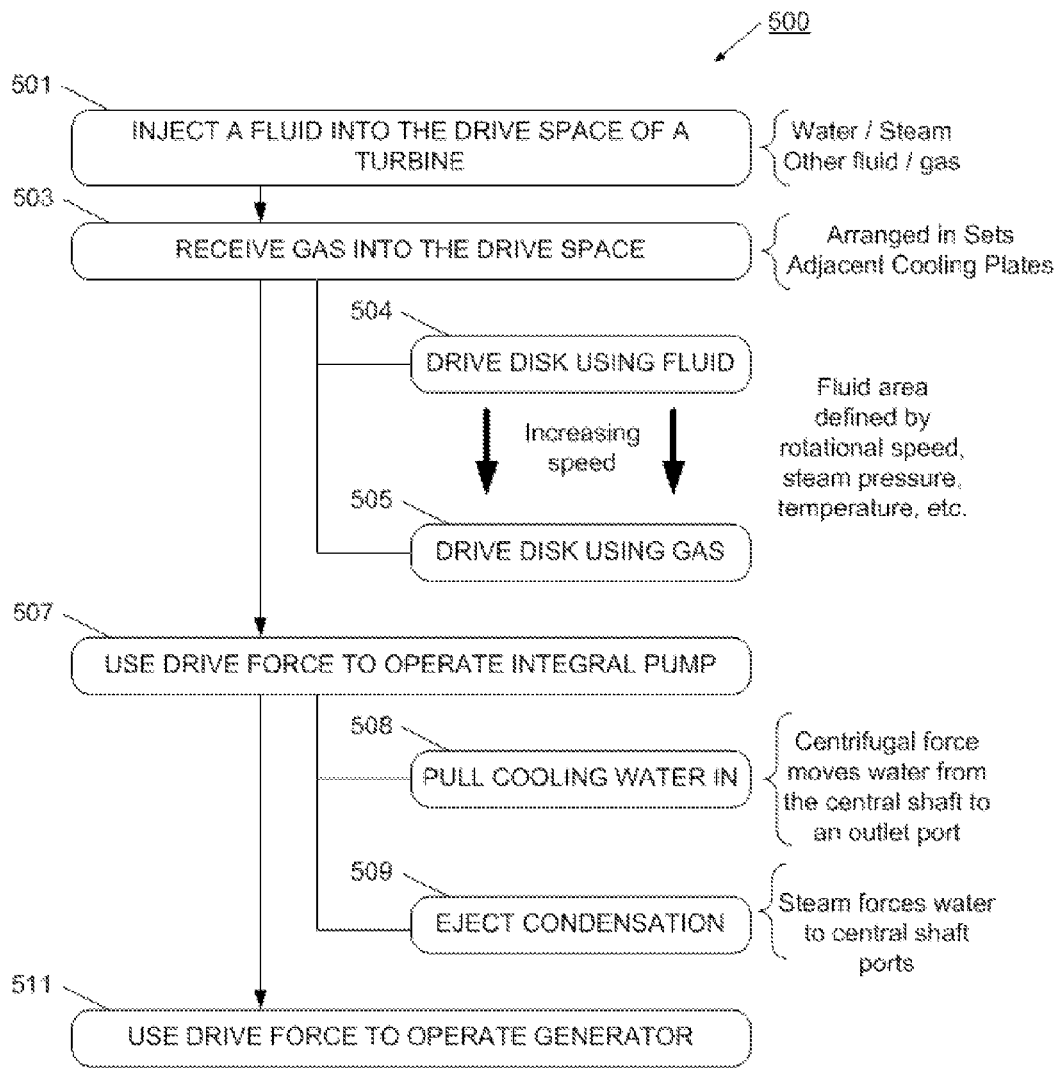
FIG. 17 is a flowchart of a process operating on a power turbine in accordance with the present invention.

Referring now to FIG. 17, a process 500 for using an electrical turbine is illustrated. Process of 500 has a fluid directed into the drive space of a stationary turbine as shown in block 501. This fluid is typically water, although another fluid may be used according to required temperature considerations. A gas, such as steam, is driven into a drive space as shown in block 503. The drive space contains fluid as shown at block 504. The gas transfers energy to fluid, which then efficiently drives the drive disk. As the drive disk increases in speed, direct steam propulsion is increased, although it will be appreciated that the relative contribution of fluid propulsion and steam propulsion may be adjusted. In this way, the turbine exhibits excellent low-speed torque due to fluid energy transmission characteristics, as well as exhibits excellent higher-speed characteristics. Further, the turbine is highly flexible in its load, speed, and environmental applications. Typically, a turbine operating both with a fluid and gas drive mechanism will spin at a much lower rotational speed then a Tesla turbine, for example, around 2000 to 6000 rpm. The slower speed to contribute to safer and simpler operation, and with the improved torque characteristics, avoids the catastrophic load failures associated with the Tesla turbine. It will be understood that other drive speeds may be used according to application needs. The driving force also operates integrally formed pumps as shown in block 507. These integrally formed pumps pull cooling water in as shown in block 508, with the cooling water used to initially load drive spaces with fluid, and during operation, to cool condenser plates to facilitate condensation. More particularly, the steam is condensed in the driving spaces. The condensation is moved from the driving spaces to pump spaces as shown at block 509. The force of the steam assists in moving the condensed liquid into the pump spaces, where it may be ejected outside the turbine for cooling. In one example, the drive force generated by the turbine is used to operate an integrally formed electrical generator as shown in block 511.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A power turbine, comprising:
   a housing;
   a plurality of disks on a shaft and separated by spacers that form respective spaces between adjacent disks; the disks, spacers, and spaces being inside the housing;
   a gas injector injecting a gas into some of the spaces near the circumference of the disks so that those spaces are drive spaces, the gas acting to drive the adjacent disks;
   a hot fluid line transporting fluid from other spaces to outside the housing, the hot fluid line positioned near the circumference of the disks so that those other spaces are pump spaces;
   a fluid port between respective drive spaces and pump spaces, the fluid port positioned to allow fluid to flow from each respective drive space into a next pump space; and
   wherein gas injected into drive spaces condenses into fluid in the drive space, so that the condensed fluid passes through the fluid port into a pump space, and by centrifugal force is moved to the hot fluid line and transported out the housing.

2. The power turbine according to claim 1, wherein the injected gas transfers energy to the condensed fluid, and the condensed fluid acts to drive the adjacent disks.

3. The power turbine according to claim 2, further comprising:
   a cool fluid line in communication with drive spaces, the cool fluid line having a cool fluid which is moved into the drive space to supplement the condensed fluid.

4. The power turbine according to claim 2, further comprising:
   a cool fluid line in communication with pump spaces, the cool fluid line having a cool fluid which is drawn into the pump space that cools disks adjacent to each pump space to facilitate improved condensation of gas into the fluid.

5. The power turbine according to claim 2, wherein the disks adjacent to the drive spaces are driven by action of the gas in a gas-driven area toward the circumference, and are driven by action of the fluid in a fluid-driven area toward the shaft.

6. The power turbine according to claim 5, wherein at spin-up of the turbine, the drive action is dominated by the fluid-driven area, and as the turbine gains speed, the size of the fluid-driven area decreases.

7. The power turbine according to claim 1, wherein drive spaces are arranged in sets of two or more adjacent drive spaces.

8. The power turbine according to claim 7, wherein a single pump space is positioned between each set of drive spaces.

9. The power turbine according to claim 8, wherein a single pump space is positioned at each end of the shaft.

10. The power turbine according to claim 1, further comprising:
    a cool fluid line in communication with pump spaces, the cool fluid line having a cool fluid which is drawn into the pump space that cools disks adjacent to each pump space.

11. The power turbine according to claim 1, further comprising:
    a cool fluid line in communication with drive spaces, the cool fluid line having a cool fluid which is moved into the drive space.

12. The power turbine according to claim 1, wherein the housing comprises a set of plates.

13. The power turbine according to claim 12, wherein each end of the housing has a respective end plate, with at least one of the end plates having a fluid outlet for the hot fluid line.

14. The power turbine according to claim 12, wherein a pump plate is coplanar with each pump space and spacer, each pump plate having a fluid port for directing fluid to the hot fluid line.

15. The power turbine according to claim 12, wherein a condenser plate is coplanar with a condenser disk, each condenser disk having one side that is in a drive space and the other side in a pump space.

16. The power turbine according to claim 12, wherein a drive plate is coplanar with each drive space, each drive plate having a gas jet for directing gas to an adjacent disk.

17. The power turbine according to claim 12, wherein an injector plate is coplanar with an injector disk, each injector disk having both sides in a drive space and the other side in a pump space.

18. The power turbine according to claim 1, wherein the housing comprises a set of plates, the set of plates further comprising:
    a respective pair of end plates, with at least one of the end plates having a fluid outlet for the hot fluid line;
    a plurality of pump plates, with each pump plate being coplanar with each pump space and spacer, each pump plate having a fluid port for directing fluid to the hot fluid line;
    a plurality of condenser plates, with each condenser plate being coplanar with a condenser disk, each condenser disk having one side that is in a drive space and the other side in a pump space; and
    a plurality of drive plates, with each drive plate being coplanar with each drive space, each drive plate having a gas jet for directing gas to an adjacent disk.

19. The power turbine according to claim 18, wherein the housing plates are connected in a pattern of:
    a) a first end plate;
    b) a pump plate;
    c) a condenser plate;
    d) a drive plate;
    e) an injector plate;
    f) a drive plate;
    g) a condenser plate;
    h) a pump plate; and
    i) a second end plate.

20. The power turbine according to claim 18, wherein the housing plates are connected in a pattern of:
    a) a first end plate;
    b) a pump plate;
    c) a plurality of plate sets, each plate set comprising:
        i) a condenser plate;
        ii) a drive plate;
        iii) an injector plate;
        iv) a drive plate; and
        v) a condenser plate;
    d) a pump plate; and
    e) a second end plate.

21. The power turbine according to claim 1, further comprising an electrical generator connected to the shaft.

* * * * *